(12) United States Patent
Shibata et al.

(10) Patent No.: US 9,207,757 B2
(45) Date of Patent: Dec. 8, 2015

(54) GESTURE RECOGNITION APPARATUS, METHOD THEREOF AND PROGRAM THEREFOR

(71) Applicant: KABUSHIKI KAISHA TOSHIBA, Tokyo (JP)

(72) Inventors: Tomoyuki Shibata, Kanagawa (JP); Yasunobu Yamauchi, Kanagawa (JP); Masashi Nishiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 13/675,664

(22) Filed: Nov. 13, 2012

(65) Prior Publication Data

US 2013/0135192 A1 May 30, 2013

(30) Foreign Application Priority Data

Nov. 14, 2011 (JP) ................. 2011-248569

(51) Int. Cl.
*G06F 3/01* (2006.01)

(52) U.S. Cl.
CPC ............... *G06F 3/011* (2013.01); *G06F 3/017* (2013.01)

(58) Field of Classification Search
CPC combination set(s) only.
See application file for complete search history.

(56) References Cited

U.S. PATENT DOCUMENTS 8,331,908 B2 * 12/2012 Verthein et al. ............. 455/411
8,760,417 B2 * 6/2014 Haug ........................... 345/173
2003/0132942 A1 * 7/2003 Obata et al. ................. 345/537
2012/0083244 A1 * 4/2012 Verthein et al. ............. 455/411
2012/0169643 A1 7/2012 Nishida et al.

FOREIGN PATENT DOCUMENTS

| CN | 101655756 | 2/2010 |
| JP | 2001-312356 | 11/2001 |
| JP | 2010-009558 | 1/2010 |
| JP | 2010-182014 | 8/2010 |
| WO | 2011/030581 | 3/2011 |

OTHER PUBLICATIONS

Gesture Recognition apparatus, Okada Ryuzo, Feb. 4, 2009, JP 2010-182014, English Translation.*
Mita, T. et al., "Discriminative Feature Co-Occurrence Selection for Object Detection", IEEE Transactions on Pattern Analysis and Machine Intelligence, vol. 30, No. 7, (Jul. 2008), pp. 1257-1269.
Comaniciu, D. et al., "Kernel-Based Object Tracking", IEEE Transactions on Pattern Analysis and Machine Intelligence, vol. 25, No. 5, (May 2003), pp. 564-577.
Watamabe. T. et al., "Co-occurrence Histograms of Oriented Gradients for Pedestrian Detection", PSIVT 2009, LNCS vol. 5414, (2009), pp. 37-47.

(Continued)

*Primary Examiner* — Van Chow
(74) *Attorney, Agent, or Firm* — Nixon & Vanderhye, P.C.

(57) ABSTRACT

A gesture recognition apparatus detects a locus of a fingertip position of a user from an acquired moving image; sets an effective range configured to set an effective range to detect a locus of the fingertip position of the user from the moving image flap action; determines whether or not the locus of the fingertip position is of the flap action when the locus of the fingertip position is included in the effective range; and recognizes a gesture of the user from the flap action when the locus of the fingertip position is of the flap action.

13 Claims, 4 Drawing Sheets

(56) References Cited

OTHER PUBLICATIONS

Office Action mailed Nov. 11, 2014 in counterpart Japanese Patent No. 2011-248569 and English-language translation thereof.

Office Action mailed 2015-06-17 in counterpart Chinese Patent No. 201210454250.3 and English-language translation thereof.

English-language machine translation of CN 101655756.

* cited by examiner

GESTURE RECOGNITION APPARATUS, METHOD THEREOF AND PROGRAM THEREFOR

CROSS-REFERENCE TO RELATED APPLICATIONS

This application is based upon and claims the benefit of priority from the prior Japanese Patent Application No. 2011-248569, filed on Nov. 14, 2011; the entire contents of which are incorporated herein by reference.

FIELD

Embodiments described herein relate generally to a gesture recognition apparatus, a method thereof and a program therefore.

BACKGROUND

In a gesture recognition apparatus in the related art, when a current motion of a specific region is detected to be a fast motion, a fast motion immediately before, which is vector information of the fast motion in the past, is extracted from a history of the current fast motion, and whether or not the current state of the specific region is a flap action which indicates that the specific region is in the fast motion in a predetermined direction is determined using an angle formed between directions of the current fast motion and the fast motion immediately before. In other words, the gesture recognizing apparatus determines a gesture command from a hand motion of a user.

However, in the gesture recognition apparatus of the related art as described above, since the flap action is determined from the speed of the hand motion. There is a problem that when the speed of a returning action which occurs after the flap action performed by the user is equal to or faster than a threshold value, the returning action is erroneously determined as the flap action.

DETAILED DESCRIPTION

According to embodiments, there is provided a gesture recognition apparatus including: an image acquiring unit configured to acquire a moving image; a detecting unit configured to detect a locus of a fingertip position of a user from the moving image; a setting unit configured to set an effective range to detect a locus of the fingertip position of the user from the moving image flap action; a determining unit configured to determine whether or not the locus of the fingertip position is of the flap action when the locus of the fingertip position is included in the effective range; and a recognition unit configured to recognize a gesture of the user from the flap action when the locus of the fingertip position is of the flap action.

The gesture recognition apparatus according to the embodiments will be described.

Embodiment 1

Figure 1:
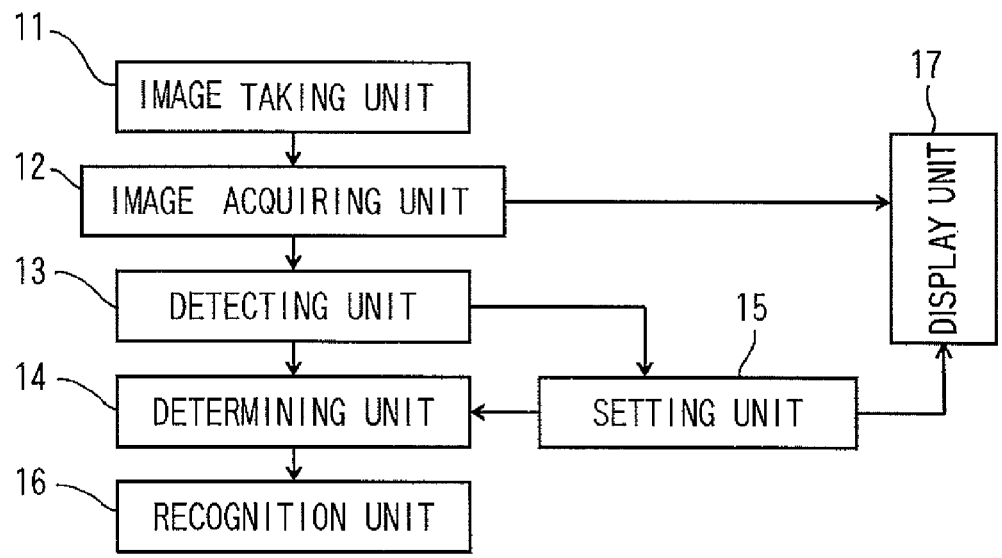
FIG. 1 is a block diagram of a gesture recognition apparatus according to Embodiment 1.
Figure 2:
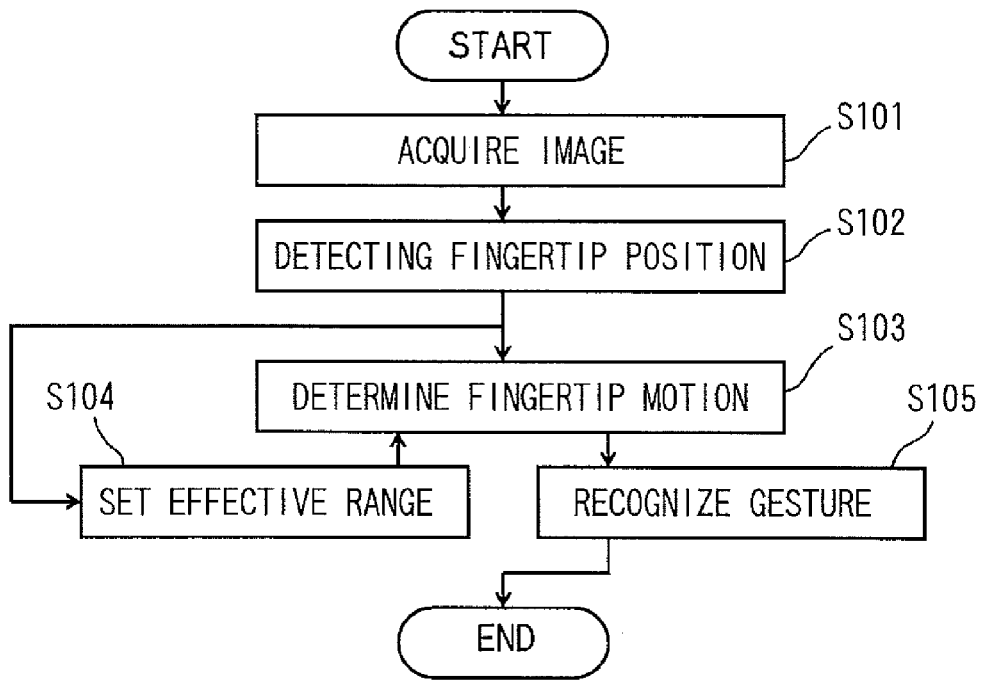
FIG. 2 is a flowchart of the gesture recognition apparatus.
Figure 3:
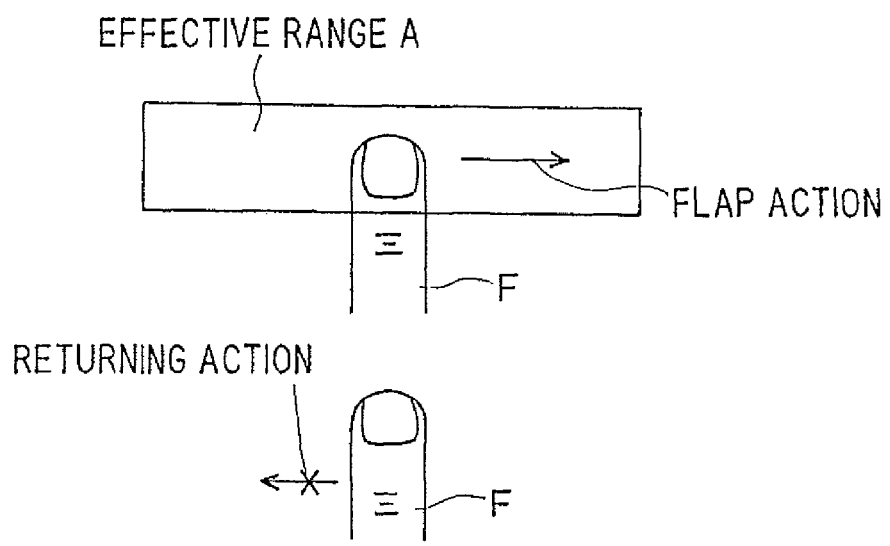
FIG. 3 is an explanatory drawing showing a fingertip motion in an effective range.

Referring now to FIG. 1 to FIG. 3, a gesture recognition apparatus 10 according to Embodiment 1 will be described.

The gesture recognition apparatus 10 according to the embodiment is configured to operate a screen by a fingertip motion of one finger F of a user, detect a flap action of the user and cause a displayed content in the screen to be transferred to a corresponding direction. The "flap action" is a fingertip motion of the user in one direction. The term "one direction" means one direction such as an upward direction, a downward direction, a leftward direction, a rightward direction or an obliquely upward direction, or an obliquely downward direction.

For example, when a user edit pictures on the screen by the "flap action", the image is changed by the action. For instant, if the user operated the picture by swiping to the one direction, the pictured is changed to the next picture, or empty. Another instance if the user operated the picture by the pinching in the center of it, the picture is changed to smaller one.

When the flap action of a fingertip is performed by the user repeatedly, an action to return the fingertip to an original position after the flap action is referred to as a "returning action".

Referring now to a block diagram in FIG. 1, a configuration of the gesture recognition apparatus 10 will be described.

The gesture recognition apparatus 10 includes an image taking unit 11, an image acquiring unit 12, a detecting unit 13, a determining unit 14, a setting unit 15, a recognizing unit 16, and a display unit 17.

The image taking unit 11 takes a moving image of the fingertip motion of the one finger F of the user. The image taking unit 11 is an imaging element such as an image sensor or a camera, and is not limited to a monocular imaging element. A distance sensor configured to add estimated distances to substances imaged in respective pixels from a sensor to the respective pixels, and a plurality of imaging elements which are capable of acquiring distances from the sensor in the same manner may be applied.

The image acquiring unit 12 acquires the moving image acquired by the image taking unit 11.

The detecting unit 13 detects a locus of a fingertip position of the one finger F from the moving image.

The determining unit 14 determines whether or not the fingertip motion is the flap action on the basis of the detected locus of the fingertip position of the one finger F and an effective range A sent from the setting unit 15.

The setting unit 15 sets the effective range A used for determining whether or not the fingertip motion is the flap action.

The recognizing unit 16 recognizes a gesture of the user from the flap action determined by the determining unit 14.

The display unit 17 displays the moving image acquired by the image acquiring unit 12 and also displays the effective range A set by the setting unit 15 in a superimposed manner.

Referring now to a flowchart in FIG. 2, an action of the gesture recognition apparatus 10 will be described.

In Step S101, the image taking unit 11 takes an image of the fingertip motion of the one finger F of the user and the image acquiring unit 12 acquires respective images (respective frames) of the taken moving image and sends the acquired frames to the detecting unit 13 respectively, and the procedure goes to Step S102.

In Step S102, the detecting unit 13 detects the fingertip positions of the one finger F shown up in the respective frames of the sent moving image. A method of detection will be described in order below.

First of all, the detecting unit 13 learns two-class classification from a pattern of the fingertip and a pattern of a background in advance, and searches a rectangular area classified as the fingertip pattern from one of the acquired frames. The fingertip area has only a few discriminative textures, heterogeneous features coming next used complementarily and cascaded, so that a fast, high-accuracy detecting process is achieved.

Secondly, the detecting unit 13 uses a "Joint Haar-like" feature vector, which is a Haar-like feature of a co-occurrence relationship developed for a face detection, to extract a candidate area of the fingertip by a classifier (see T. Mita, T. Kaneko, B. Stenger, and O. Hori, Discriminative feature co-occurrence selection for object detection, IEEE Trans. Pattern Anal. Mach. Intell., Vol. 30, No. 7, pp. 1257-1269, 2008) learned by AdaBoost algorithm.

Thirdly, the detecting unit 13 finally detects the fingertip position by Support Vector Machine (see T. Watanabe, S. Ito, and K. Yokoi, Co-occurrence histograms of oriented gradients of pedestrian detection, In PSIVT 2009, LNCS, Vol. 5414, pp. 37-47, 2009.) using a Co-occurrence Histograms of Oriented Gradients feature vector, which is a co-occurrence matrix obtained from a two-dimensional histogram including a combined brightness gradient developed for human detection.

The classifier on the upstream side is characterized by having an ability to achieve very fast classification, and the classifier on the downstream side is characterized by having an ability to achieve classification at high accuracy using detailed characteristic although not as fast as the classifier on the upstream side.

When the result of detection of the fingertip exists in the past frames, the detecting unit 13 performs a tracking process on the basis of the result.

Since whether or not an object in the frames is the fingertip is detected from the characteristic focusing on the texture (for example, the feature vector) in both of the methods of detection described above, the detection cannot be achieved unless the image of the texture of the fingertip cannot be taken with a fine resolution due to a motion blur. Therefore, the fingertip may be followed using color information on the basis of a method as described in Non-Patent Document (D. Comaniciu, V. Ramesh and P. Meer, Kernel Based Object Tracking, PAMI, Vol. 25, No. 5, pp. 564-577, 2003).

The detecting unit 13 determines a result obtained by integrating the fingertip position of the one finger F detected by the current frame and the locus of the fingertip positions in the past by a logical addition as a final fingertip position of the current frame.

The detecting unit 13 sends the detected fingertip position of the one finger F of the current frame (for example, a rectangle indicated by an upper left coordinate and a lower right coordinate) to the setting unit 15 and the determining unit 14.

The detecting unit 13 detects continuously the fingertip position of the one finger F of the moving image from one frame to another. Accordingly, the detecting unit 13 sends the detected locus of the fingertip position.

In Step S103, the determining unit 14 determines whether or not the fingertip motion of the one finger F is the flap action on the basis of the locus of the fingertip position of the one finger F in the past frames with respect to the sent current frame and the effective range A sent from the setting unit 15 as shown in FIG. 3. For obtaining the locus of the fingertip position, respective fingertip positions in the arbitrary number of frames, N (for example, 5 frames) sent from the detecting unit 13 are used.

The determining unit 14 determines the fingertip motion only within the effective range A. The effective range A is set by the setting unit 15 from the fingertip motion shown up in frames until the previous frame, and this setting will be described later. The determining unit 14 does not determine the fingertip motion in a range other than the effective range A.

The determining unit 14 determines whether or not the locus of the fingertip position is included in the effective range A and, if the locus is included in the effective range A, proceeds to the next process and, if not, determines that it is not the flap action.

Subsequently, the determining unit 14 determines whether or not the fingertip motion is the motion learned in advance (the fingertip motion in one direction) on the basis of the amount of characteristic composed of a speed (x component and y component) and an acceleration (x component and y component) of the fingertip at a current time point in an image obtained from the locus of the finger position. In this determination, the discriminator is used and the motion (the fingertip motion in one direction) is learned in advance by, for example, either k-Nearest Neighbour Classification, or Support Vector Machine. With this determination, the determining unit 14 is capable of excluding actions such as a zigzag movement of the fingertip.

Also, a threshold value of speed and a threshold value of acceleration are set in advance, so that the determining unit 14 is capable of excluding a slow movement of the one finger F even though the fingertip motion is the flap action.

However, in the determination described above, the returning action cannot be excluded. Therefore, as shown in FIG. 3, the user performs the returning action in the range other than the effective range A.

The determining unit 14 sends a result of determination of the fingertip motion which is determined as the flap action to the recognizing unit 16, and the procedure goes to Step S104.

In Step S104, the setting unit 15 sets the effective range A used for the determination of the fingertip in the next frame from the locus of the fingertip position of the one finger F in the N frames sent from the detecting unit 13 and sends the same to the determining unit 14, and displays the effective range A so as to be superimposed on the image shown up in the display unit 17.

First of all, the setting unit 15 sets an initial range of the effective range A on the entire image.

Subsequently, the setting unit 15 sets the range in which the fingertip is moved as the effective range A from the locus of the fingertip position of the one finger F in the N frames detected by the detecting unit 13. For example, assuming that N is 5 (N=5), the setting unit 15 sets an area expressed by the locus from the fingertip position on an $n^{th}$ frame to the fingertip position on an $(n+4)^{th}$ frame in the past as the effective range A. The effective range A does not have to be a strict range in which the fingertip is moved and, as shown in FIG. 3, the effective range A is expressed by the rectangular area and for example, the size in the lateral direction is determined by the fingertip position on the $n^{th}$ frame and the fingertip position on the $(n+4)^{th}$ frame and the size on the vertical direction is set to a size one to three times the size of the fingertip.

Subsequently, the setting unit 15 sends the preset effective range A on the $(n+4)^{th}$ frame to the determining unit 14 and the display unit 17. The determining unit 14 is used for the determination of an $(n+5)^{th}$ frame as described above. The display unit 17 displays the effective range A in the image in the superimposed manner as shown in FIG. 3.

The setting unit 15 initializes the effective range A when the fingertip position detected in the $n^{th}$ frame and the fingertip position detected in an $(n+1)^{th}$ frame are apart from each other by a distance equal to or larger than the threshold value.

In Step S105, the recognizing unit 16 recognizes the gesture of the user on the basis of the flap action determined by the determining unit 14 and ends the process. As a method of recognition, for example, a method described in Patent Document 1 may be employed.

According to the embodiment, determination may be achieved only by the flap action, and the probability of erroneous determination between the returning action and the flap action is reduced. In other words, the probability of the erroneous determination between the returning action and the flap action as of the related art may be reduced by the user performing the returning action in the range other than the effective range A shown up in the display unit 17.

Embodiment 2

Subsequently, the gesture recognition apparatus 10 according to Embodiment 2 will be described with reference to FIG. 4.

A different point between the gesture recognition apparatus 10 of this embodiment and the gesture recognition apparatus 10 in Embodiment 1 is a function of the determining unit 14 and the setting unit 15.

In this embodiment, the setting unit 15 does not set the effective range A in the image, but sets a one-dimensional direction vector which indicates the flap action. The direction vector is the vector of predetermined direction, and the direction can be selected one of the specified direction by the user.

Figure 4:
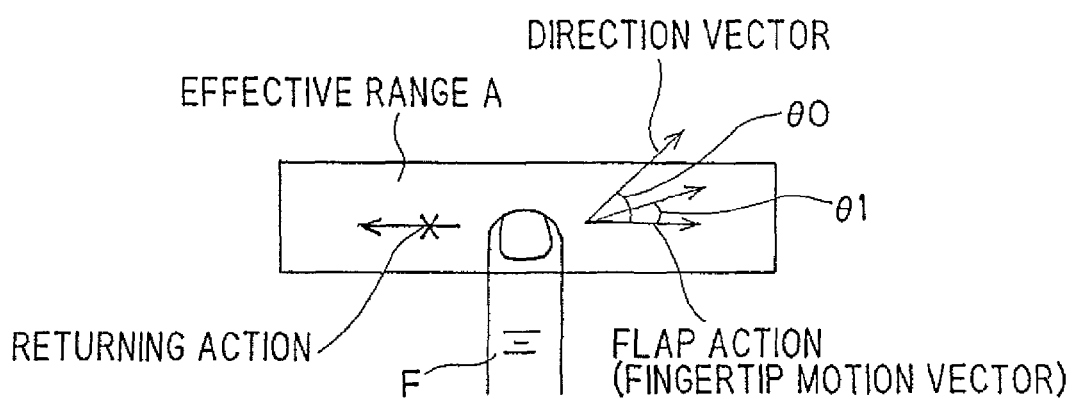
FIG. 4 is an explanatory drawing showing a fingertip motion in an effective range according to Embodiment 2.

The determining unit 14 compares an angle θ1 formed between a fingertip motion vector obtained from the locus of the fingertip position and a direction vector and a determination angle θ0 (for example, $-30° \leq θ0 \leq 30°$) as regards the fingertip motion in the effective range A as shown in FIG. 4. And the determining unit 14 determines that the action is the flap action when the corresponding angle is $θ1 \leq θ0$. In FIG. 4, the flap action is indicated by θ1=0° and the returning action is indicated by θ1=180°.

Then, the setting unit 15 initializes the effective range A when the distance between the preset effective range A and the fingertip position is equal to or larger than the threshold value.

In the embodiment, it is not necessary to display the effective range A on the display unit 17.

According to this embodiment, the user needs not to perform the returning action in the range other than the effective range A shown up on the display unit 17 as in Embodiment 1, and hence even when the user performs the returning action in the effective range A, only the flap action can be determined.

Embodiment 3

Subsequently, a gesture recognition apparatus 100 according to Embodiment 3 will be described with reference to FIG. 5 and FIG. 6.

A different point between the gesture recognition apparatus 100 of this embodiment and the gesture recognition apparatus 10 in Embodiment 1 is in that the gesture recognition apparatus 100 of this embodiment has a managing unit 118. In other words, although the gesture recognition apparatus 10 of Embodiment 1 recognizes the gesture on the basis of the fingertip motion of the one finger F, the gesture recognition apparatus 100 of this embodiment includes the managing unit 118, thereby recognizing the gesture on the basis of the fingertip motion of a plurality of fingers F.

Description about portions of the gesture recognition apparatus 100, which are the same as the gesture recognition apparatus 10, will be omitted.

Referring now to a block diagram in FIG. 5, a configuration of the gesture recognition apparatus 100 will be described.

Figure 5:
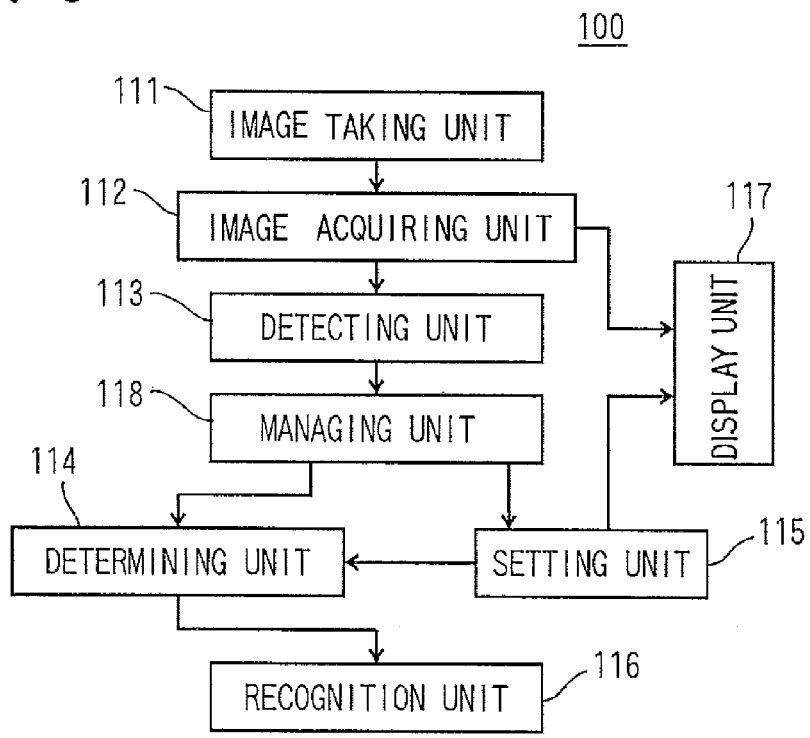
FIG. 5 is a block diagram of a gesture recognition apparatus according to Embodiment 3.
Figure 6:
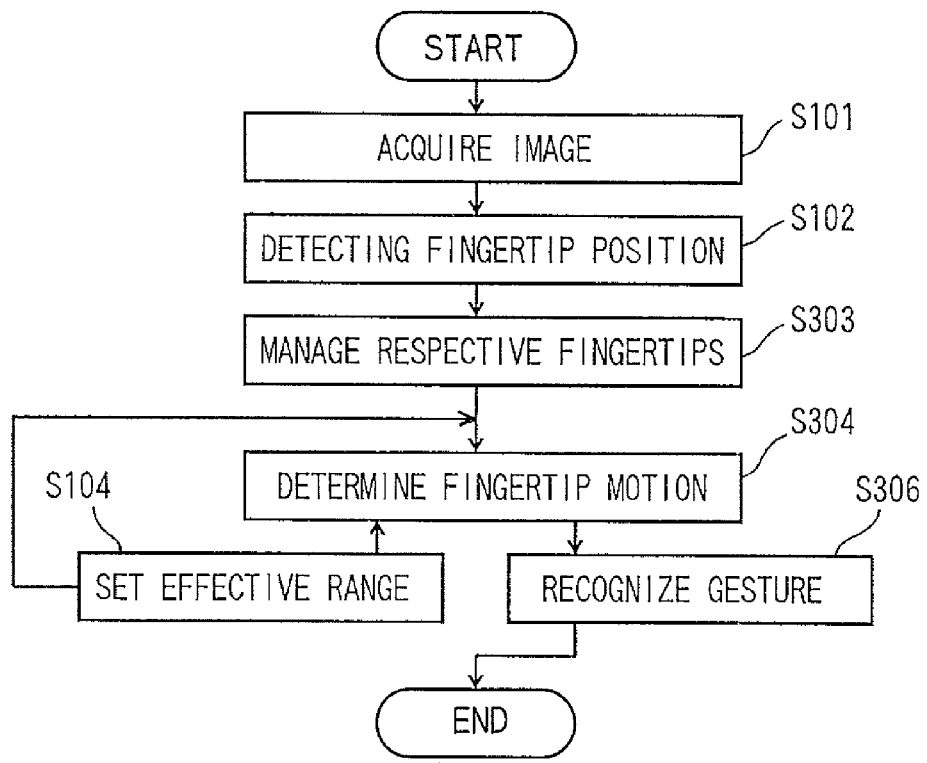
FIG. 6 is a flowchart of the gesture recognition apparatus according to Embodiment 3.

The gesture recognition apparatus 100 includes, as shown in FIG. 5, the managing unit 118 as described above in addition to an image taking unit 111, an image acquiring unit 112, a detecting unit 113, a determining unit 114, a setting unit 115, and a recognizing unit 116.

The image taking unit 111 takes images of fingertips of the plurality of fingers F of the user.

The image acquiring unit 112 acquires the moving image taken by the image taking unit 111.

The detecting unit 113 detects the respective fingertip positions in the respective frames and sends a result of the detection to the managing unit 118. The method of detection is the same as Embodiment 1.

The managing unit 118 specifies the fingertip of the one finger F from the fingertips of the plurality of fingers F, and sends only the locus of the specific finger position to the determining unit 114 and the setting unit 115.

The determining unit 114 determines whether or not the fingertip motion of the fingertip specified by the managing unit 118 is the flap action on the basis of the locus of the specific fingertip position sent from the detecting unit 113 via the managing unit 118 and the effective range A set by the setting unit 115. The method of determination is the same as Embodiment 1.

The setting unit 115 sets the effective range A from the locus of the specific fingertip position sent from the detecting unit 113 via the managing unit 118 and sends the set effective range A to the determining unit 114. This method of setting is the same as Embodiment 1.

The managing unit 118 determines whether or not the one fingertip motion is the flap action, then sends the locus of the specific fingertip position to the determining unit 114 and the setting unit 115 in order to determine the next fingertip motion. When the determination of the fingertip motions of all the fingers F is ended, the control is terminated.

The recognizing unit 116 integrates the determined fingertip motions (flap actions), and recognizes whether or not the motion is a gesture defined by multi-fingertip motions. For example, gestures defined by a two-fingertip motion include "pinch out" which is an operation made by two fingers moving different directions to widen the distance therebetween, and "pinch in" which is an operation to reduce the distance between two fingers. At this time, these gestures may be performed by using either two fingers of one hand, one finger each of both hands, or fingers of two users.

These gestures may be any motions defined by the fingertip motion of two or more fingers as long as being fingertip motions in one-dimensional direction which can be determined by the determining unit 114, and an action to flick all the fingers (five fingers) of one hand outward from the center of the hand may be defined as a gesture to separate and scatter a plurality of objects displayed thereon.

Referring now to a flowchart in FIG. 6, an action of the gesture recognition apparatus 100 will be described. Steps S101 to S102 in FIG. 6 among the actions of the gesture recognition apparatus 100 are the same as Steps S101 to S102 in FIG. 2, so that description will be omitted.

In Step S303, the number of fingers F detected by the detecting unit 113 and the fingertip positions of these fingers F are input to the managing unit 118 from one frame to another. The managing unit 118 specifies the fingers F whose fingertip motions are determined in order, and sends the locus of the specific fingertip position to the determining unit 114 and the setting unit 115.

In Step S304, the determining unit 114 determines whether or not the fingertip motion is the flap action on the basis of the effective range A set by the setting unit 115 relating to the locus of the specific fingertip position. The setting unit 115 sends a result of the determination to the recognizing unit 116.

In Step S305, the setting unit 115 sets the effective range A from the next frame used for determination of the fingertip motion from the locus of the specific fingertip position and sends the set effective range A to the determining unit 114.

In Step S306, the recognizing unit 116 recognizes whether or not a combination of the fingertip motions of all the fingers F is preset gestures or not, and terminates the process.

Embodiment 4

Figure 7:
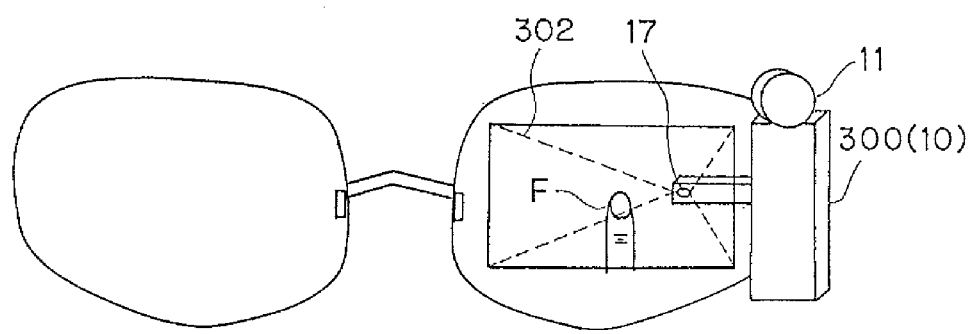
FIG. 7 is an explanatory drawing of an application of a gesture recognition apparatus according to Embodiment 4.
Figure 8:
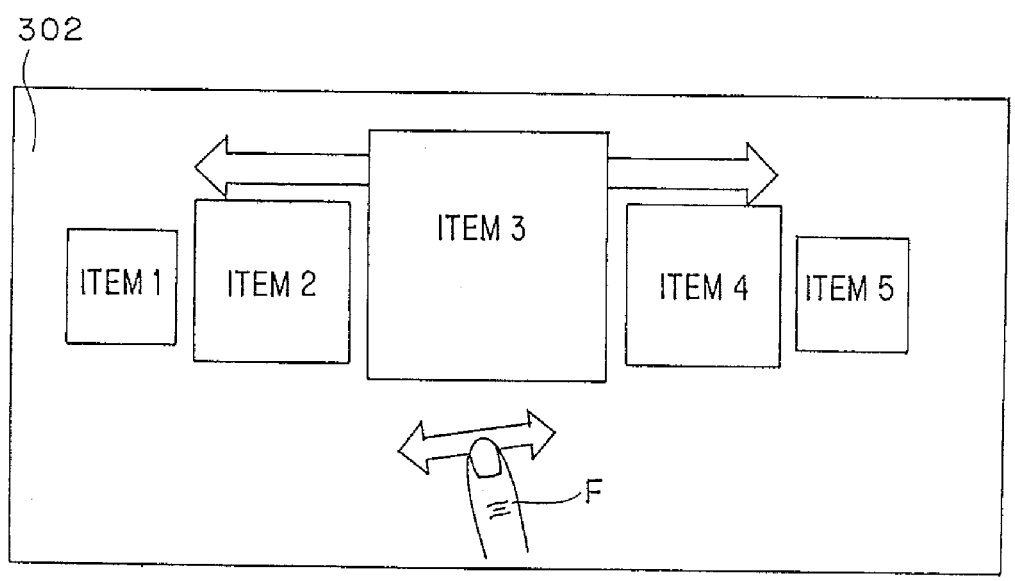
FIG. 8 is a display screen of a head mount display.

Referring now to FIG. 7 and FIG. 8, Embodiment 4 will be described. This embodiment is an example in which the gesture recognition apparatus 10 in Embodiment 1 is applied to a head mount display 302.

As shown in FIG. 7, this embodiment performs sliding of displayed items of the head mount display 302 by gestures. For the head mount display 302 developed for hand free operation, an operation by gesture recognition which allows the hand free operation is effective.

The head mount display 302 has a wearable computer 300, the display unit 17, and the image taking unit 11. The gesture recognition apparatus 10 is integrated in the wearable computer 300 as a program.

The image taking unit 11 takes an image of a scene in the direction of the line of sight of the user.

The display unit 17 displays an image on the head mount display 302.

The wearable computer 300 (the gesture recognition apparatus 10) recognizes the flap action of the user's finger F and, as shown in FIG. 8, executes a command to scroll a plurality of items being displayed on the head mount display 302 by the display unit 17 in the direction of motion on the basis of the flap action of the corresponding finger F.

According to the embodiment, the user is capable of viewing the items in detail by scrolling the items in the direction of the flap action.

Modifications

Modifications of the above-described embodiments will be described.

Modification 1 is a modification of the amount of characteristic used by the determining unit 14 for determination. As amounts of characteristic other than that described in the above-described embodiments are as follows.

As a first amount of characteristic from among other amounts of characteristic, a four-dimensional amount of characteristic including an average x speed of N frames, an average x acceleration of N frames, an average y speed of N frames, and an average y acceleration of N frames.

As a second amount of characteristic from among other amounts of characteristic, a 4N−6-dimensional amount of characteristic having a speed obtained by using N−1 histories and an acceleration obtained by using N−2 histories as elements.

Although Embodiment 4 described above has been described with the example of the head mount display 302, the gesture recognition apparatus 10 is not limited thereto, and may be applied to other apparatuses. The gesture recognition apparatus 100 in Embodiment 2 may also be applied.

The gesture recognition apparatuses 10 and 100 may be implemented by using a general-purpose computer as a basic hardware. In other words, the image acquiring units 12 and 112, the detecting units 13 and 113, the determining units 14 and 114, the setting units 15 and 115 and the managing unit 118 may be implemented by causing a processor mounted on the above-described computer to execute a program. At this time, the gesture recognition apparatuses 10 and 100 may be implemented by installing the above-described program on the computer in advance, or may be implemented by storing the program in a recording medium such as a CD-ROM or by distributing the above-described program via a network, thereby allowing the user to install the program on the computer as needed. Also, the image acquiring units 12 and 112, the detecting units 13 and 113, the determining units 14 and 114, the setting units 15 and 115, and the managing unit 118 may be implemented by using a memory integrated in or externally connected to the above-described computer, a hard disk, or storage media such as a CD-R, a CD-RW, a DVD-RAM, or a DVD-R as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gesture recognition apparatus comprising:
an image acquiring unit configured to acquire a moving image;
a detecting unit configured to detect a locus of a fingertip position of a user from the moving image;
a setting unit configured to set an effective range for determining whether or not a flap action is performed, and to determine a size in one direction of the effective range from the locus of the fingertip position in N frames;
a determining unit configured to determine whether or not the locus of the fingertip position is of a flap action when the locus of the fingertip position is included in the effective range; and
a recognizing unit configured to recognize a gesture of the user flap action when the locus of the fingertip position is of the flap action.

2. The apparatus according to claim 1, further comprising a display unit configured to display the moving image and the effective range in a superimposed manner.

3. The apparatus according to claim 1, wherein the setting unit sets also a first direction vector which indicates the flap action in addition to the effective range, and the determining unit determines that the locus of the fingertip position is of the flap action when the locus is included in the effective range and an angle formed between a second vector indicated by the locus of the fingertip position and the first direction vector is smaller than a determination angle.

4. The apparatus according to claim 1, further comprising:
a managing unit configured to send loci of fingertip positions of respective fingers to the determining unit and the setting unit in order when the detecting unit detects the loci of the respective fingertip positions of a plurality of fingers, wherein
the setting unit sets the effective ranges from one finger to another,
the determining unit performs determination of the flap action from one finger to another, and
the recognizing unit integrates the flap action of the plurality of fingers to recognize the gesture of the user.

5. The apparatus according to claim 1, wherein the effective range is a rectangular area.

6. A gesture recognition method comprising:
acquiring a moving image;
detecting a locus of a fingertip position of a user from the moving image;
setting an effective range for determining whether or not a flap action is performed from the locus of the fingertip position, and determining a size in one direction of the effective range from the locus of the fingertip position in N frames;
determining whether or not the locus of the fingertip position is of the flap action when the locus of the fingertip position is included in the effective range; and
recognizing a gesture of the user from the flap action when the locus of the fingertip position is of the flap action.

7. A non-transitory computer readable medium including programmed instructions, wherein the instructions, when executed by a computer, cause the computer to perform at least:
acquiring a moving image;
detecting a locus of a fingertip position of a user from the moving image;
setting an effective range for determining whether or not a flap action is performed from the locus of the fingertip position, and determining a size in one direction of the effective range from the locus of the fingertip position in N frames;
determining whether or not the locus of the fingertip position is of the flap action when the locus of the fingertip position is included in the effective range; and
recognizing a gesture of the user from the flap action when the locus of the fingertip position is of the flap action.

8. The apparatus according to claim 5, wherein the setting unit determines the size in one direction of the effective range which is the rectangular area from the locus of the fingertip position, and determines the size in the other direction from the size of the fingertip.

9. A gesture recognition apparatus comprising:
storage for storing a program; and
a computer processor communicatively coupled to the storage, the computer processor configured to execute the program stored in the storage to control the gesture recognition apparatus to perform operations comprising:
acquiring a moving image;
detecting a locus of a fingertip position of a user from the moving image;
setting an effective range for determining whether or not a flap action is performed, and determining a size in one direction of the effective range from the locus of the fingertip position in N frames;
determining whether or not the locus of the fingertip position is of a flap action when the locus of the fingertip position is included in the effective range; and
recognizing a gesture of the user flap action when the locus of the fingertip position is of the flap action.

10. The apparatus according to claim 9, further comprising a display configured to display the moving image and the effective range in a superimposed manner.

11. The apparatus according to claim 9, wherein the operations further comprise:
setting a first direction vector which indicates the flap action in addition to the effective range; and
determining that the locus of the fingertip position is of the flap action when the locus is included in the effective range and an angle formed between a second vector indicated by the locus of the fingertip position and the first direction vector is smaller than a determination angle.

12. The apparatus according to claim 9, wherein the operations further comprise:
detecting the loci of the respective fingertip positions of a plurality of fingers;
setting the effective ranges from one finger to another;
determining the flap action from one finger to another; and
integrating the flap action of the plurality of fingers to recognize the gesture of the user.

13. The apparatus according to claim 9, wherein the effective range is a rectangular area.

* * * * *